United States Patent [19]

Chang

[11] Patent Number: 4,465,738

[45] Date of Patent: Aug. 14, 1984

[54] WETTABLE COATINGS FOR INORGANIC SUBSTRATES

[75] Inventor: Franklin S. Chang, Mt. Prospect, Ill.

[73] Assignee: Borg-Warner Corporation, Chicago, Ill.

[21] Appl. No.: 504,563

[22] Filed: Jun. 15, 1983

[51] Int. Cl.$^3$ .............................................. B05D 3/06
[52] U.S. Cl. .................................... 428/426; 204/168; 204/169; 427/41; 427/255.6; 428/441; 428/461
[58] Field of Search .............. 427/41, 255.6; 204/168, 204/169; 428/426, 442, 441, 461, 463

[56] References Cited

U.S. PATENT DOCUMENTS

| | | | |
|---|---|---|---|
| 3,068,510 | 12/1962 | Coleman | 204/168 |
| 3,252,830 | 5/1966 | Cummin et al. | |
| 3,318,790 | 5/1967 | Carbajal et al. | 204/168 |
| 3,397,132 | 8/1968 | Wolinski | 204/168 |
| 3,415,683 | 12/1968 | Coffman et al. | 204/168 |
| 3,421,930 | 1/1969 | Knox et al. | 117/93.1 |
| 3,666,533 | 5/1972 | Lee | 117/93.1 GD |
| 3,944,709 | 3/1976 | Levy | 427/41 |
| 4,143,949 | 3/1979 | Chen | 351/160 H |
| 4,188,426 | 2/1980 | Auerbach | 427/40 |
| 4,366,184 | 12/1982 | Auerbach et al. | 427/41 |

OTHER PUBLICATIONS

"Review of Recent Work on Hard 1-C Films", L. P. Andersson, *Thin Solid Films 86* pp. 193-200 (1981).

"Preparation and Properties of Hard 1-C and i-BN Coatings," Weissmantel, et al., *Thin Solid Films 96* pp. 31-44 (1982).

*Primary Examiner*—John H. Newsome
*Attorney, Agent, or Firm*—Richard J. Schlott

[57] ABSTRACT

In organic substrates having a surface coating including a first layer of plasma-polymerized alkane and a top layer of plasma-polymerized polar organic compound exhibit improved wettability and hydrophilicity, and a method for applying such coatings to the surfaces of inorganic substrates to improve their hydrophilicity and wettability characteristics.

11 Claims, No Drawings

WETTABLE COATINGS FOR INORGANIC SUBSTRATES

BACKGROUND OF THE INVENTION

This invention relates to the modification of a surface and more specifically to enhancing the wettability character of a surface by depositing thereon a coating comprising a hydrophilic layer of plasma-deposited polar organic compound. Still more particularly the invention relates to a method for modifying and improving the wettability of inorganic substrates by plasma deposition of a coating comprising a first layer of non-polar organic compound and a top layer of polar organic compound, and to coated articles prepared by the processes of this invention.

Methods for the deposition of polymeric films upon a substrate by employing a plasma generated by an electrical discharge in an atmosphere of gaseous organic monomer are well known in the art. For example, in U.S. Pat. Nos. 3,318,790 and 3,421,930, the problems attaching to such polymerizations initiated by corona discharge are discussed and methods for producing polymeric coatings are disclosed. Modifying surfaces by cold plasma deposition of fluorocarbon monomers to alter the surface characteristics of substrates is described in U.S. Pat. No. 4,188,426, and bonding of hydrophilic polymeric coatings to hydrophobic contact lens materials is disclosed in U.S. Pat. No. 4,143,949. In general, these processes have been successful in achieving modification of surface characteristics, and particularly where hydrophobic coatings on metallic substrates are desired. The application of non-polar coatings such as fluorocarbon polymer films by these processes to inorganic substrates including metallic substrates to achieve improved lubricity, a high degree of hydrophobicity and chemical inertness has been widely described and used in the coating art. Where increased hydrophilicity is desired, particularly for inorganic substrates, the deposition of durable, well-adhered coatings has been less successful.

The development of a method for depositing thin, pin-hole free hydrophilic coatings on inorganic and particularly on metallic substrates that adhere well and are durable under a variety of end use conditions would thus be a useful advance in the coating art.

SUMMARY OF THE INVENTION

This invention is a process for depositing a well-adhered hydrophilic coating on an inorganic substrate. The coating comprises a plasma-deposited first layer formed of an alkane, and a top layer formed by plasma deposition of a polar organic compound. The coating is formed by a glow discharge in a low-pressure gaseous atmosphere containing the requisite organic compound in vapor form as is conventionally practiced in the art for plasma polymerizations. The pin-hole free coatings adhere well to inorganic substrates, are durable and hydrophilic in character.

Although the surface modification of inorganic substrates by the method of this invention is described as a deposition of a coating, the precise nature of the coating layers is not well understood. The extremely thin layers that result are not amenable to removal and analysis, hence are best described in terms of the process of preparation, wherein the substrate is first exposed to a glow discharge in the presence of a low pressure atmosphere containing an alkane vapor, then subsequently exposed to a glow discharge in the presence of a low pressure atmosphere containing a polar organic compound. The first stage polymerized alkane layer formed on the substrate appears to serve as a bonding layer for the subsequent layer or layers formed of polar organic molecules. The multi-layered coating is well-adhered to the substrate and is extremely thin, normally on the order of 1 to 20 microns in total thickness. A single-layer coating formed directly on the substrate and formed only of polar organic compound is poorly adhered and readily removed by mild abrasion or rubbing.

DETAILED DESCRIPTION OF THE PREFERRED EMBODIMENTS

The alkanes useful in forming the first layer of the coating in the practice of this invention include the lower $C_1$–$C_6$ alkane hydrocarbons that are gaseous or that vaporize under conditions of low pressure and moderate temperatures employed in plasma polymerizations, that is, at or near the normal room temperature range of from 10° to 40° C. Included for example are methane, ethane, propane, butane, pentane, hexane and mixtures and isomers thereof. Preferred for their low temperature volatility are the $C_1$–$C_2$ alkanes, and most preferred is methane.

The polar organic compounds useful in forming the hydrophilic top layer of the coating in the practice of this invention include low molecular weight organic compounds that are similarly gaseous or volatile under the temperature and pressure conditions employed in the process, and contain polar groups such as carboxylic acid groups, carbonyl groups, carboxylic amide groups, amine groups, hydroxyl groups and the like. Organic compounds containing polar groups and a polymerizable ethylenic double bond will be preferred for their ready polymerizability. Examples of such polar organic compounds include acrylic acid, acrylamide, the methacrylic analogs thereof, methyl vinyl ketone, ethylene amine and the like, and mixtures thereof.

Glow discharge-initiated polymerizations are widely known and well-described in the art, as for example in U.S. Pat. Nos. 3,666,533 and 4,143,949, and a variety of process equipment is commercially available for the practice of such polymerization processes. In general, a glow discharge, characterized as a low pressure, low voltage electrical discharge, is established in a partial vacuum at ambient temperatures and several hundred volts. Any A.C., D.C. current source, or a capacitively or inductively coupled rf current source, may be utilized. The voltage will usually be applied at low current density to spaced electrodes within an evacuated chamber, containing the substrate to be coated and having access to means for introducing gaseous reactants and means for evacuating the chamber. The operating range of pressures will generally lie in the range 0.1 to 1 Torr., and the process will be performed at ambient temperatures, although elevated temperatures and higher pressures may be employed with higher voltages if desired. The reactant gas is admitted to the glow discharge region of the reactor at a rate which will maintain the pressure in the desired range, and polymerization is continued for a period of 5 to 30 minutes. It will be recognized that the specific conditions and polymerization times will depend in part upon the particular reactive gas employed, the configuration of the substrate surface to be coated and the design of the glow discharge equipment. These conditions may be readily established by simple experimentation and by the specifications and guidelines supplied by the maker of the plasma polymerization process equipment.

In the practice of this invention, the coating will be applied in a sequential process, by first introducing the alkane into the glow discharge region of the chamber, carrying out the polymerization or deposition of the alkane upon the surface, then flushing the chamber with the power off to remove unreacted alkane. After re-establishing the polymerization conditions within the chamber, the subsequent layers are deposited by introducing the polar organic compound and carrying out the polymerization to deposit the top layer on the alkane-coated surface.

As previously said, the nature of the individual coating layers is not well understood. The glow discharge activation and deposition of an alkane to form an apparently polymeric layer upon a substrate may proceed by free radical processes to provide a crosslinked polyalkane layer, or the process may result in some form of carbonaceous deposit. Whatever the actual structure of the alkane-formed deposit, it serves to tightly adhere a subsequently deposited layer formed by glow discharge from a vapor or gas containing a polar organic compound. The resulting coating is thus tightly adhered and more durable than coatings omitting the intervening alkane-formed layer, and provides the desired hydrophilic character to the substrate surface. It will be apparent that a multi-layer coating having one or more layers deposited upon the alkane layer could also be prepared by the process of this invention, and that masking of particular areas to limit the deposition of the coating to selected areas is also possible.

The practice of this invention will be better understood from consideration of the following examples, which are provided by way of illustration and are not intended to be limiting.

The reactor employed in the following Examples comprised chamber formed by a glass bell jar sealed to an aluminum base plate by a neoprene gasket. The base plate was fitted with a valved gas inlet port attached selectively to a supply of the specified reactive alkane or polar organic compound, and an exit port attached to a vacuum pump. Spaced electrodes were placed within the chamber and attached through leads to a capacitively-coupled source of radio frequency (rf) electrical energy. Substrate coupons being coated were placed on a substrate holder between the electrodes to obtain good exposure to the plasma discharge.

EXAMPLE 1

Aluminum coupons were first cleaned with acetone, rinsed with trichloroethylene and air-dried. The coupons were placed in the reactor chamber, the chamber evacuated, and a glow discharge was established by applying rf power to the electrodes. After five minutes exposure, methane gas was admitted to the chamber while maintaining a pressure of 0.5 Torr., and at an rf power level of 25 watts for about 20 minutes. The rf power was then shut off, the chamber was re-evacuated fully, and then purged with acrylic acid vapor. Pressure was re-established at 0.6 Torr., while admitting acrylic acid vapor, and the glow discharge was re-established at 20 watts of rf power for 10 minutes. The rf power was then shut off, and the coated coupons removed for testing.

The surface of the coated coupons were wettable, as established by contact angle measurement values of 33°, 32° and 52° for three samples. Rubbing of the surface with tissue paper did not reduce the wettability, and the coating remained wettable, i.e., was not removed, after two weeks immersion in deionized water.

EXAMPLE 2

The process of Example 1 was carried out using glass microscope slides. The coated slides were transparent, and wettable as before.

CONTROL EXAMPLES

Aluminum coupons and glass slides were coated with a single layer of acrylic acid as the polymerizable polar monomer. The process of Example 1 was employed, omitting the initial coating step of glow discharge in the presence of methane.

The acrylic-coated aluminum and glass surfaces were wettable as before. When rubbed lightly with tissue, the coating was removed and the surface became nonwettable, as shown by contact angle measurement values in excess of 90°. Simply coating glass and aluminum surfaces with acrylic acid monomer without glow discharge gave surfaces that were not wettable.

The invention will thus be seen to be a method for increasing the hydrophilic character of the surfaces of inorganic substrates by depositing thereon a coating comprising a plasma-deposited first layer formed from a lower alkane and a plasma-deposited top layer formed from a polar organic compound, and coated inorganic substrates prepared by the process of this invention. Such substrates would find wide use in applications wherein a high degree of wettability is desirable as an aid in improving heat transfer characteristics. It will be apparent to those skilled in the art that further modification of the process of this invention, including the deposition of several similar or dissimilar layers, the use of continuous, batch or semi-batch operation, and the like, may be accomplished without departing from the scope thereof.

I claim:

1. A method for improving the wettability and hydrophilicity of the surface of an inorganic substrate comprising applying to a surface of said substrate a first layer formed by the reaction of an alkane in the presence of a low pressure glow discharge, and a top layer formed by the reaction of a polar organic compound in the presence of a low pressure glow discharge.

2. The method of claim 1 wherein said alkane is a $C_1$-$C_6$ hydrocarbon.

3. The method of claim 1 wherein said alkane is methane.

4. The method of claim 1 wherein said polar organic compound is an organic compound containing a polar group and an ethylenic double bond.

5. The method of claim 1 wherein said polar organic compound is acrylic acid.

6. The method of claim 1 wherein the inorganic substrate is selected from the group consisting of glass and aluminum.

7. The method of claim 1 wherein said low pressure glow discharge is carried out at a temperature of from about 10° C. to about 40° C. and at a pressure of from about 0.1 to about 1.0 Torr.

8. A method for improving the wettability and hydrophilicity of the surface of an inorganic substrate selected from the group consisting of glass and aluminum, comprising first exposing at least one surface of said substrate to a low pressure glow discharge in the presence of a vapor of a $C_1$-$C_6$ alkane hydrocarbon, then exposing said substrate to a low pressure glow discharge in the presence of a vapor of a polar organic compound, said exposures to low pressure glow discharge being carried out at a temperature in the range of from about 10° C. to about 40° C. and at a pressure in the range of from about 0.1 to about 1.0 Torr.

9. The method of claim 8 wherein the alkane hydrocarbon is methane and the polar organic compound is acrylic acid.

10. An inorganic substrate having a coating on at least one surface, said coating comprising a first layer formed by the reaction of a $C_1$–$C_6$ alkane hydrocarbon in the presence of a low pressure glow discharge, and a top layer formed by the reaction of a polar organic compound in the presence of a low pressure glow discharge, each of said reactions being carried out at a temperature in the range of from about 10° to about 40° C. and at a pressure in the range of from about 0.1 to about 1.0 Torr.

11. The inorganic substrate of claim 10 wherein said hydrocarbon is methane and said polar organic compound is acrylic acid.

* * * * *